United States Patent
Berkenkoetter et al.

(10) Patent No.: US 6,372,290 B1
(45) Date of Patent: Apr. 16, 2002

(54) METHOD OF MAKING A TEMPERATURE AND SCRATCH RESISTANT ANTI-STICKING COATING

(75) Inventors: Herbert Berkenkoetter, Oelde; Friedel Kaup, Guetersloh; Thomas Kruempelmann, Guetersloh; Walter Mangen, Guetersloh; Ulrich Sillmen, Guetersloh, all of (DE)

(73) Assignee: Miele & Cie. GmbH. & Co., Guetersloh (DE)

( * ) Notice: Subject to any disclaimer, the term of this patent is extended or adjusted under 35 U.S.C. 154(b) by 0 days.

(21) Appl. No.: 09/254,520

(22) PCT Filed: Jul. 3, 1998

(86) PCT No.: PCT/EP99/04126

§ 371 Date: Mar. 5, 1999

§ 102(e) Date: Mar. 5, 1999

(87) PCT Pub. No.: WO99/02463

PCT Pub. Date: Jan. 21, 1999

(51) Int. Cl.[7] .................................................. C23C 16/00
(52) U.S. Cl. ........................ 427/255.18; 427/255.13; 427/255.14; 427/387; 427/409; 427/419.4; 427/419.5
(58) Field of Search ................................ 428/428, 429, 428/447, 448, 450; 427/255.13, 255.14, 255.18, 255.19, 387, 409, 419.4, 419.5

(56) References Cited

U.S. PATENT DOCUMENTS 5,240,774 A * 8/1993 Ogawa et al. ............ 428/411.1
5,435,839 A   7/1995 Ogawa ........................ 106/10

FOREIGN PATENT DOCUMENTS

AU   524276    9/1998
EP   0492417   7/1992

* cited by examiner

Primary Examiner—D. S. Nakarani
(74) Attorney, Agent, or Firm—Karl Hormann

(57) ABSTRACT

The invention relates to a carrier material having an inorganic molecular structure and a surface coating produced by applying a substance and by heat treatment. The invention also relates to a method for the production and to the appropriate uses of said surface coating. Carrier materials made of glass, metal or ceramic should be provided with a surface coating with anti-sticking properties against water-based and/or oil-based organic materials or water-oil emulsions while exhibiting at the same time essentially better temperature-resistant and anti-scratch characteristics than conventional PTFE or silicon coatings. The requirements are met by an inventive surface coating consisting of a combination of inorganic molecules of the carrier material and organic molecules of an applied substance on the uppermost molecular layer of said coating. In order to produce such a surface, an inorganic substance with silicone-like networks is initially applied. Subsequently, heat treatment is carried out, whereby the temperature and duration of said treatment are chosen in such a way that the purely organic coating applied is fully decomposed and/or removed so that a combination of inorganic molecules of the carrier material and organic molecules of the applied substance is formed. The appropriate carrier material with the inventive surface coating can be advantageously use above all in household appliances and kitchenware.

11 Claims, 3 Drawing Sheets

METHOD OF MAKING A TEMPERATURE AND SCRATCH RESISTANT ANTI-STICKING COATING

BACKGROUND OF THE INVENTION

1. Field of the Invention

The invention relates to a carrier substance of an inorganic molecular structure and provided with a surface coating produced by application of a substance and heat treatment. Furthermore, the invention relates to a method of producing, as well as suitable uses for, the surface coating.

2. The Prior Art

For providing a scratch and temperature resistant surface, it is generally known to use surfaces of enamel, glass, glass ceramics or similarly structured systems, i.e. networks particularly of silicon dioxide and/or other metal oxides. Also, metal surfaces such as, for instance, steel, stainless steel, aluminum, and chromium, which while inferior as regards these properties, are, nevertheless, acceptable compared to surfaces of organic materials. The above mentioned properties are especially needed in surfaces used in the field of household appliances.

Also, surfaces coated with polytetrafluoroethylene (Teflon®) or silicone are known which are distinguished by their non-stick properties. The excellent non-stick properties of PTFE and silicone-like surface systems against burnt-in food are particularly noticeable in baking pans, cooking and baking utensils. However, since those coatings are relatively thick their maximum useful temperatures are below 250° C. to 300° C. Moreover, because of its relatively thick coating such a surface will suffer significant damage when used frequently and abusively, and will lose its favorable characteristics in those areas which have been damaged. A further disadvantage of the known surface coating is that bonding agents have to be applied to a scratch and temperature resistant surface prior to the application of the organic coating. While non-sticking is the resultant new property, the scratch and temperature resistance of the surface of the carrier material will be lost. While in its new state a non-stick surface requires no scrubbing or scouring to be cleaned, its non-stick properties will deteriorate after several uses particularly close to their maximum useful temperature, and cleaning is possible only with greater effort. The surface will thus be damaged mechanically, and the non-stick property of the surface will deteriorate.

Bonding with water or oil based materials or with water/oil emulsions is accomplished by bonding forces between molecular groups of the surface and corresponding atoms/molecules of the bonded organic material. Typical reactive molecular groups of the surface are, for instance, OH groups which to a great extent define the surfaces of silicone based systems. The OH groups at the carrier surface are either absorbed by bonding the coating, or they escape from the system as a result of chemical reaction. The remaining few reactive molecular groups of the coating material then define the non-stick characteristics. A substantial draw back is that such relatively thick surface coating behaves very much like organic materials of low scratch and temperature resistance. The properties of the underlying inorganic layer cannot permeate to the outer surface.

OBJECTS OF THE INVENTION

It is, therefore, an object of the invention to provide a surface on metallic, ceramic and glass-like carrier materials with non-stick properties against water and/or oil based organic materials or water/oil emulsions while at the same time being substantially more temperature and scratch resistant than conventional coatings of PTFE or silicone.

SUMMARY OF THE INVENTION

In accordance with the invention the object is accomplished by a carrier material and a surface coating in which the surface coating in its uppermost molecular layers consists of a compound of inorganic molecules of the carrier material and organic molecules of an applied substance. In another advantageous embodiment, the invention proposes a novel method of producing a non-stick surface on a base carrier surface by applying to the surface an organic substance including silicone-like networks followed by a heat treatment for cross-linking the molecules of the carrier surface and of the substance and removing, by evaporation, any excess substance whereby a new network is formed of surface and substance molecules. Other objects will in part be obvious and will in part appear hereinafter.

Aside from a scratch and temperature resistant surface the advantages attainable by the invention are, in particular, that the surface is resistant even against temperatures in excess of 300° C. and that it has non-stick properties with respect to water and/or oil based organic materials or water/oil emulsions. On a molecular plane the surface of the substrate has at least local network structures with at least one layer of molecules of reactive bonding molecular groups being bonded to the uppermost network plane. A layer-forming organic substance with silicone-like networks is applied to this surface. In the upper molecular layer of the substrate surface close to the surface the reactive bonding molecular groups react chemically with the molecules of the organic substance and form a transitional range with respect to the organic surface without leading to the formation of a pure organic layer. Within this transitional range the reacting molecular groups are substituted by hydrophobic and/or oleophobic atoms or molecules or groups of molecules. If the non-stick coating does not reject another surface when in use, the latter surface will define the surface characteristics of the entire system. In accordance with a further embodiment unintended organic protective films on the non-stick surface can be removed without loss of the non-stick properties. Except in the mentioned transitional range between inorganic and organic substances the growth of an organic layer is prevented at the end of or during a heat treatment process above the decomposition temperature of the silicone-like substance. As a result, the organically modified uppermost plane of the inorganic substrate remains. An advantageous field of application of surfaces modified in this manner relates to enameled surfaces of substrates. The modified surface is used especially in connection with electrical household appliances or kitchen furniture. The use of a modified surface imparts especially advantageous properties to a glass-ceramic cooking surface, baking, roasting, broiling and/or microwave oven and/or to components to be placed into a roasting chamber and/or to baking, roasting, cooking containers, for instance, cooked food containers.

BRIEF DESCRIPTION OF THE SEVERAL DRAWINGS

The novel features which are considered to be characteristic of the invention are set forth with particularity in the appended claims. The invention itself, however, in respect of its structure, construction and lay-out, as well as manufacturing techniques, together with other objects and advantages thereof, will best be understood from the following description of preferred embodiments when read with reference to the appended drawings, in which:

DESCRIPTION OF PREFERRED EMBODIMENTS

In use, the properties of a surface are always defined by its final exposed coating. A surface made, i.e. modified in accordance with the invention and a method for producing a surface thus modified will hereafter be described in connection with a substrate surface similar to glass or ceramic. The description is not, however, intended to exclude the modification of other types of substrate surfaces.

Figure 1:
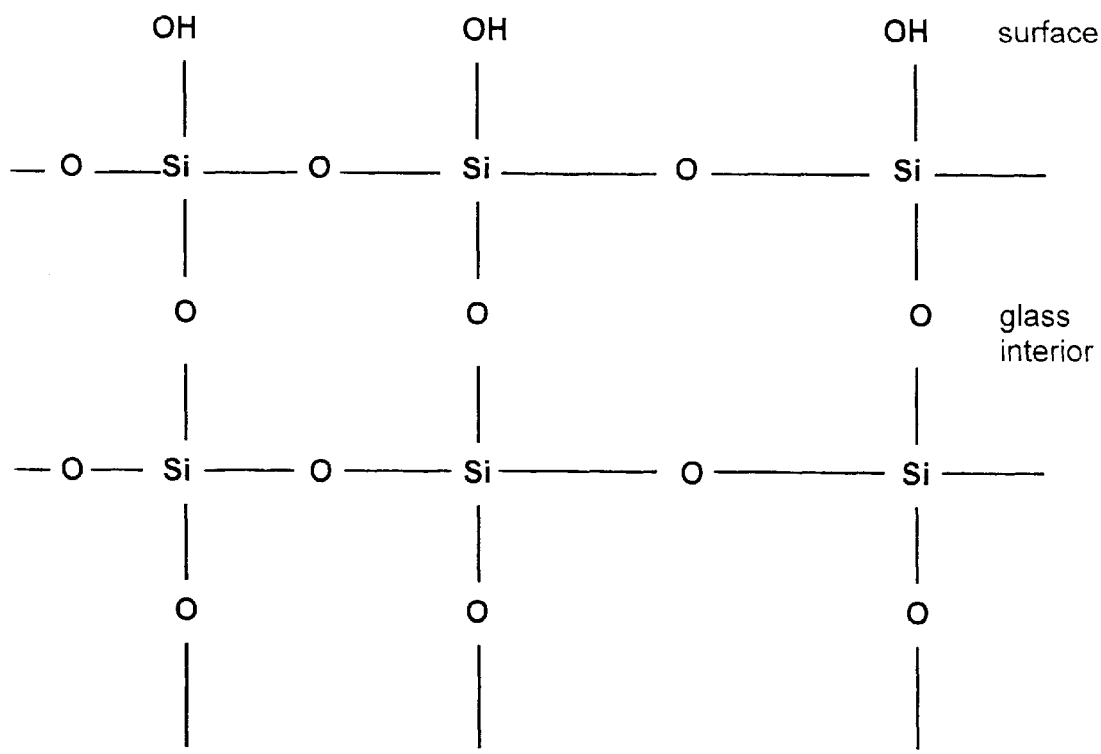
FIG. 1 depicts a silicon oxygen network of a conventional glass surface or of a surface of a glass-like material (prior art)

FIG. 1 depicts a silicon oxygen network of a conventional glass or glass-like carrier material without coating. Typically, molecular groups similar to the OH groups shown are formed at the surface of such a carrier material. By a chemical reaction, for instance by condensation, these molecular groups may be made to react with aqueous and/or water based coatings on the surface. They also react strongly with vegetable and/or animal fats. In use this leads to the formation on the surface of strongly bonded residues which can only be removed with difficulties.

Figure 2:
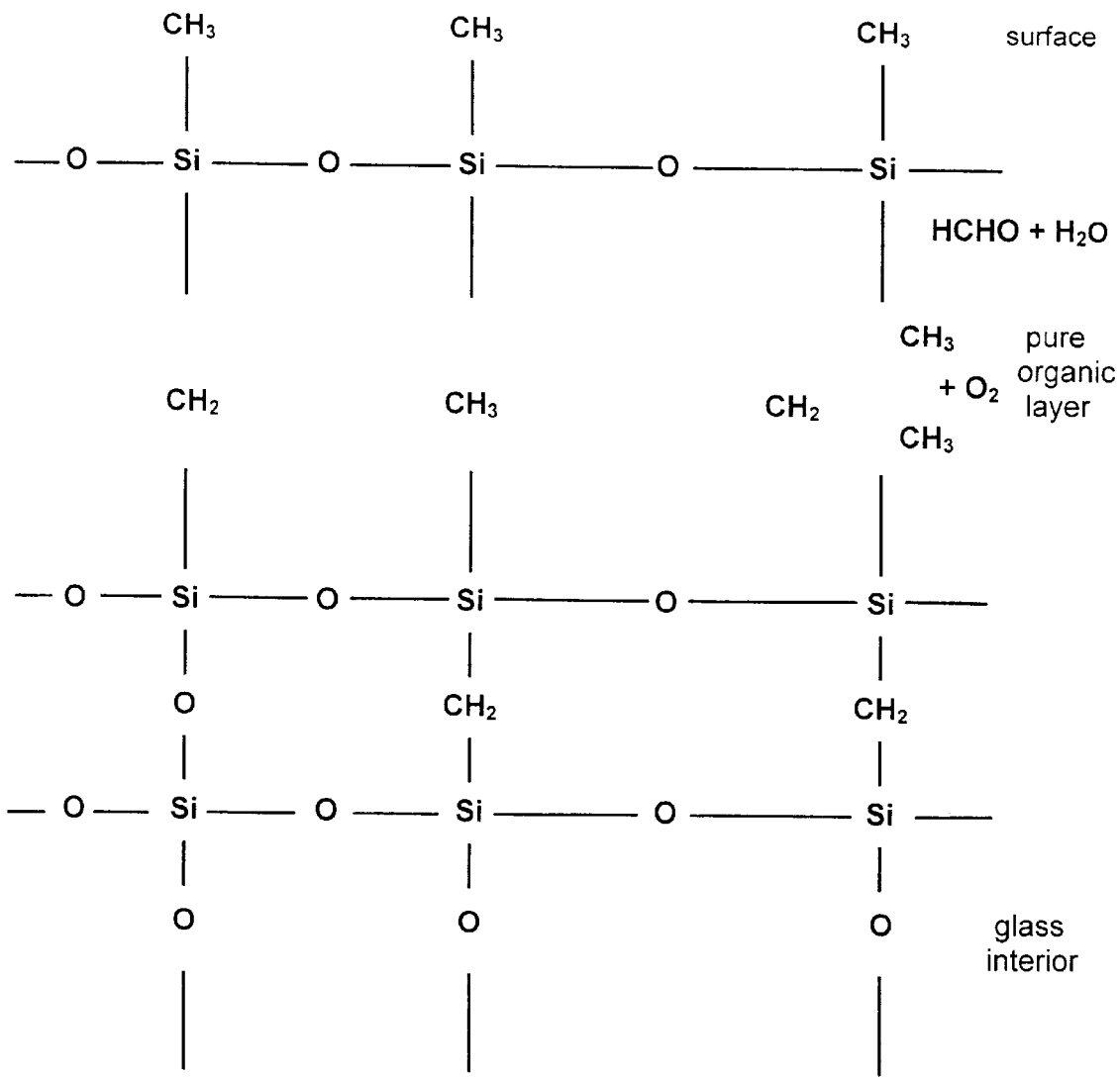
FIG. 2 depicts the silicon oxygen network of FIG. 1 with a conventional surface coating (prior art)

FIG. 2 depicts a network which exhibits structures resulting from applying to the carrier material an inherently permanent organic coating. Though an improved non-stick effect is obtained by low reactive molecular groups ($CH_3$) formed at the outer molecular layers, yet the inherently permanent relatively thick organic coating is prone to suffer from mechanical action.

Figure 3:
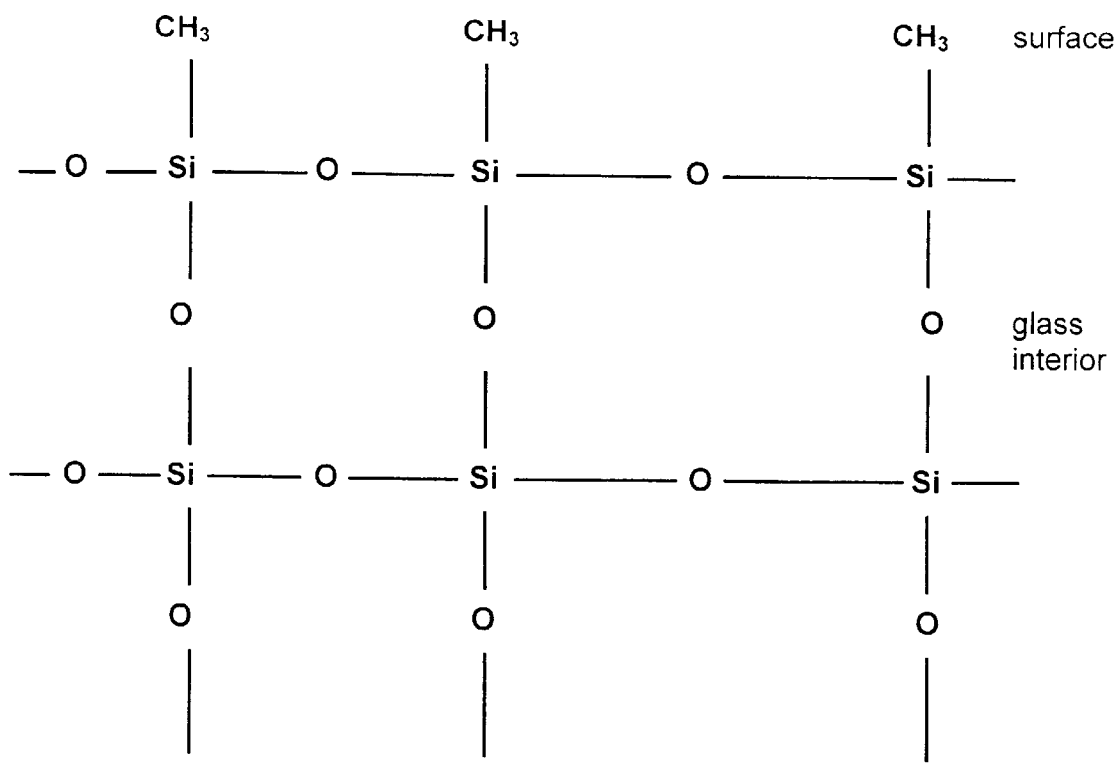
FIG. 3 depicts the silicon oxygen network of FIG. 1 with a surface modified in accordance with the invention.

FIG. 3, by contrast, depicts a network produced in accordance with the invention in which even the uppermost molecular layer is formed by substantially non-reactive molecules of the $CH_3$ group immediately adjacent to which there is positioned the molecular structure of the carrier material.

Hence, the terminal or final molecular groups shown in FIG. 1 as OH groups are substituted by substantially non-reactive molecular groups of the applied substance. The methyl groups depicted here have hydrophobic and oleophobic properties. The OH groups of the prior art may, however, also be substituted by phenyl groups. It is essential that the organic modification of the surfaces, i.e. the incorporation of carbon (C atoms) is restricted to the uppermost layer of the surface, but in any event to the upper several layers. In this manner, the thermal and mechanical characteristics of the inorganic material will be substantially maintained. In connection with the modified surfaces it was experimentally proved that, for instance, methyl groups are retained in the SiO nets even at very high temperatures (>500° C.).

The reactive bonding molecular groups forming the uppermost molecular layer of the initial substrate surface are substituted by atoms, molecules or molecular groups which are hydrophobic, oleophobic or both hydrophobic and oleophobic. The surface of the modified system consists of only one, but in no case more than very few net layers in which substantially non-reactive molecular groups are bound. Hence, an organically modified inorganic system is produced only in the uppermost layer of the surface. Any excess organic substance is substantially dissolved during the heat treatment of the coating process, without forming a permanent layer of its own. The surface produced by this process may be mechanically cleaned with impunity by the same means as a glass or ceramic surface. It is stable at temperatures up to about 500° C. and possesses non-stick characteristics.

The organic substance may be applied in various ways. In a manner known per se the surface of the carrier material which exhibits a local network structure is brought into contact at a low temperature with at least one silicone-like component or thermal decomposition products thereof, in liquid form or in a gaseous phase. This leads to cross-linking within the liquid with the reactive bonding molecular groups of the carrier material. Thereafter, for a time dependent upon the thickness of the layer, the changed surface (including the carrier) is tempered at a temperature above the decomposition temperature of the silicone-like network. The organic layer of the cross-linked silicone-like liquid which may have become too thick during the coating process will evaporate and will thus decompose pyrolytically. Only the one required molecular layer of this substance with non-stick properties remains, which connect to the silicone oxide or other metal oxide net or to the exterior, e.g., OH groups. The preferred tempering temperature is a temperature in the range between 300° C. and 700° C. The silicone-like liquid contains polydimethylsiloxanes or polydimethylsiloxanes with special ends, such as phenyl, vinyl, hybrid, silanol, amino, epoxy, or carbinol ends. The silicone liquids are substantially non-reactive or they are modified by reactive groups. The silicone-like liquid may contain additional components such as, for instance, silicone resins and organic solvents and thinners, water, emulsifiers, cleaning compounds, cross-linking accelerators, encapsulation systems and the like.

Another way of modifying the surface of the carrier material is preferably carried out by heating the substrate surface, as well as the oven into which the surface has been placed for modification, to about the same elevated temperature. Following this, a liquid or solid silicone-based substance is evaporated, preferably in a separate chamber, and the substance converted into a gaseous state is brought into contact with the surface of the substrate. To this end, the temperature of the substrate surface is to be chosen to be higher than the evaporation temperature of the silicone-like substance. At the same time, the temperature of the substrate surface should be higher than the decomposition temperature of the silicone-like substance. Since the temperature of the source (evaporator) is lower than that of the surface to be modified (sink) the formation of "thicker" layers on the surface to be modified is prevented. In the event, but for the concentration gradient between source and sink no accumulation would occur. Raising the temperature of the surface to a temperature above the decomposition temperature of the organic substance will additionally result in preventing organic layers from accumulating. Only the desired organic modification of the inorganic surface will remain. The temperature of the evaporator lies between 150° C. and 600° C., whereas the temperature of the surface is between 300° C. and 700° C.

The carrier material provided with the surface coating in accordance with the invention is particularly useful either where frequent cleaning is unavoidable or where improved corrosion protection is necessary against thermal corrosion or chemical attacks (laundry lye, salt water). A modified surface is of special advantage in household appliances, for instance cooking surfaces of glass ceramics, baking, roasting, broiling and/or microwave ovens, including parts thereof, baking, roasting and cooking vessels with enameled, chromium-plated or stainless steel surfaces, washing machine drums, or dish washing sinks of stainless steel. In addition, many advantages such as, for instance, repelling chemicals (e.g. starch from laundry) are derived from a modified surface in clothes mangles having aluminum parts, aluminum oxide with or without anodized hardened surfaces and/or laundry iron surfaces. Scarcely any lime or calcium sediments are formed on tubular heaters the carrier material surfaces of which have been modified, for instance, in water boilers, washing machines and dish washers. Such a modification may also be applied, however, to glass and glass-like carrier materials, such as, for instance, bottles for beverages, laboratory glasses, glass, glass ceramic and ceramic surfaces, systems of a similar chemical structure, such as glass shop counters, glass door panels in general, shop windows, large surface three-dimensional glass structures of vapor vent hoods, (kitchen) cupboard windows or on plain metal and coated metal surfaces, such as, for instance, any kind of stainless steel or aluminum surfaces. In many individual cases a surface of a carrier material of the kind described supra is structured more smoothly which results in reduced sliding friction and often, because of it, lower noise.

At least the interior surface of the coated carrier material of cooking, roasting, baking or frying vessels of enameled steel, glass, glass ceramic, ceramic, porcelain and the like (e.g. pots or cake forms) which comes into contact with the food to be prepared should be treated by one of the processes described above. Of course, it would be best if their other surface would be additionally treated in accordance with the process. Also, in door glass panes with IR reflecting properties of known tin dioxide coatings, the tin dioxide reflector may be provided with an organically modified surface coating made be the same process as silicone dioxide and other glass or glass ceramic-like metal oxide surfaces.

Surfaces suitable for modification may be applied to glass, glass ceramic, ceramic surfaces and systems of a similar chemical structure on electric household appliances such as, for instance, glass service panels, door panes in general, display windows, large surface 3D glass structures on venting hoods, doors of (kitchen) cupboards and so forth. Components of a warming chamber made of glass, glass ceramic, ceramic or related materials, such as baking sheets, drip pans, removable side and surface panels, lamp covers, interior door panes of a stove, such as a baking oven or a microwave apparatus. At least one side, preferably all sides, however, of their surface are organically modified for the above described non-stick properties. In cooking, roasting, baking and frying vessels of glass, glass ceramic, ceramic, porcelain and the like (e.g. pot or cake forms) at least the inner surface which comes into contact with the food to be processed should be modified as described above. It is best, however, to modify their exterior surfaces as well. IR reflectors based upon known tin dioxide coatings of door panes may be organically modified as well by the same process as silicone dioxide and other glass, and ceramic-like metal oxide surfaces.

The enamel as described above may also be modified in a pyrolysis oven provided with an oven chamber and components coated with pyrolysis enamel at a pyrolytic cleaning cycle at conventional temperatures between 400° C. and 600° C. The modified non-stick layer is also resistant against the usual pyrolytic temperatures of 480° C. The interior door pane should be modified to be stick resistant. Preferably the pyrolysis oven is provided with a glass door including a glass ceramic interior pane without a structural frame and, preferably, the glass ceramic interior pane should also be modified. Its temperature resistance makes it possible after each cleaning cycle to regenerate its modified surface followed by an exposure to a high temperature. But even in an oven with chrome-plated accessories or stainless steel parts in or at the roasting chamber, such as broiling grids, broiling skewers, support grids for baking sheets, telescoping arms, vapor vanes and/or air exhaust vanes (outside of the oven chamber !) and the like, the surfaces of those parts should be modified in the manner described supra.

If, in use, another layer adheres to the non-stick coating the former layer defines the surface characteristics of the entire system. Hence, it is apparent that the sedimentation of undesired layers is to be prevented. Some cleaning agents, for instance stainless steel cleaners, are combinations of cleaning agents and protective agents specifically developed to form such protective layers on the surfaces to be treated by them. Such protective films on non-stick surfaces are contraindicative, for either their non-stick property is such that the protective films cannot adhere, or a simple method has to be developed for removing such foreign protective film in order to reestablish the non-stick properties. It is for this reason that the surface should have non-stick as well as scratch and scouring resistant properties. A conventional enamel coated surface may be the basis of such a treated surface. The modified surface is regenerated by exposing the non-stick surface previously cleaned, serviced and/or protected for a short time to a temperature above the decomposition temperature of the protective film. This eliminates the undesired protective film of the treatment agent by evaporation or pyrolytic decomposition. Since its non-stick properties suffer no damage as a result of such heat treatment, the surface will be fully reuseable after each cleaning, servicing and/or protective treatment. The organically modified layer with non-stick properties below an undesired organic cover layer may be regenerated by heat treatment.

Baking ovens equipped in their baking chambers with surfaces or components modified in the above described manner are suitable for regeneration of the modified surfaces. They should be equipped with a user actuated switching element for cycling the oven through a regeneration. In this manner, a user, after first carefully cleaning the oven and its accessories with little effort in the usual manner, may then cause the modified surface to regenerate itself. To this end, the accessories are placed in an empty state into the oven chamber. Under its function or setting "Regeneration of the non-stick property" the oven executes regeneration cycle along a time/temperature curve, and any organic protective films formed by cleaning agents are removed from the modified surface. The surface is cleaned from any organic layer present and the modified non-stick surface will again be exposed. By input means, the user may alter duration and temperature of the regeneration process within predetermined limits (from a minimum to a maximum effect). Preferably, the treatment temperature is between 200° C. and 400° C. and the holding time is from 15 to 30 min.

Since a stainless steel surface is not particularly scratch resistant, it may be desireable to provide it with a surface coating without changing the expensive look of the stainless steel. Since at higher temperatures stainless steel quickly and irreversibly takes on heat-tinting colors, a way has to be found of modifying the surface coating without discoloring the stainless steel. Such a way consists of directly applying, at low temperatures (e.g. <100° C.), a very thin coating of transparent glass or ceramic (e.g. water glass) to the stainless steel surface in order to prevent a change in color of the stainless steel. Thereafter the surface is treated by the above described process.

What is claimed is:

1. A method of forming a temperature and scratch resistant coating on a surface of an inorganic carrier material comprising at least one organo-functional molecular group, comprising the steps of:

applying to the surface a coating of an organic substance comprising silicone-like networks;

heat-treating the carrier material with the coating of the organic substance thereon at a temperature in excess of the permissible operating temperature of the organic substance and for a duration selected to ensure a reaction for cross-linking the organo-functional molecular groups with the silicone-like networks of the substance, and evaporating excess organic substance.

2. The method of claim 1, wherein the surface of the carrier material comprises stainless steel and wherein the application of the coating is preceded by applying a layer of one of glass and ceramic to the surface.

3. The method of claim 1, wherein the organic substance is applied to the surface in a chamber maintained at a temperature not falling below the operating temperature of the organic substance.

4. The method of claim 1, further including the steps of converting the organic substance to its gaseous phase and precipitating it on the carrier surface within a heated treatment chamber.

5. The method of claim 4, further including the step of raising the temperature of the organic substance to above its decomposition temperature and of thereafter applying the organic substance in a gaseous phase to the surface.

6. The method of claim 4, further including the steps of raising the temperature of the organic substance to below its decomposition temperature and of thereafter applying the organic substance in a gaseous phase to the surface.

7. The method of claim 4, further including the step of conveying the organic substance to the treatment chamber at a temperature not lower than the temperature of the carrier material.

8. The method of claim 1, wherein the organic substance when coated on the carrier material surface is at a temperature below its decomposition temperature and that following coating the carrier material and the organic substance are subjected to a heat treatment.

9. The method of claim 1, wherein the heat treatment is performed at a temperature between about 300° C. and about 700° C.

10. The method of claim 1, wherein the organo-functional groups of the surface of the carrier material comprises one of methyl groups and phenyl groups.

11. The method of claim 1, wherein the organic substance has one of hydrophobic and oleophobic properties.

* * * * *

UNITED STATES PATENT AND TRADEMARK OFFICE
CERTIFICATE OF CORRECTION

PATENT NO.    : 6,372,290 B1
DATED         : April 16, 2002
INVENTOR(S)   : Berkenkoetter et al.

It is certified that error appears in the above-identified patent and that said Letters Patent is hereby corrected as shown below:

<u>Title page,</u>
Item [86], please correct to read as follows:
-- [86] PCT No.:  PCT/EP98/04126 --

Signed and Sealed this

Eleventh Day of June, 2002

*Attest:*

*Attesting Officer*

JAMES E. ROGAN
*Director of the United States Patent and Trademark Office*